Jan. 7, 1969　　　M. P. NIELSEN　　　3,420,078
KEY CASE
Filed Aug. 4, 1967

INVENTOR
MELTON P. NIELSEN
BY
Clarence M. Crews
ATTORNEY.

United States Patent Office 3,420,078
Patented Jan. 7, 1969

3,420,078
KEY CASE
Melton P. Nielsen, 815 J St., Crescent City, Calif. 95531
Filed Aug. 4, 1967, Ser. No. 658,467
U.S. Cl. 70—456                                   10 Claims
Int. Cl. A45c 11/32

ABSTRACT OF THE DISCLOSURE

A combined case and operator for a pair only of related flat keys is provided, consisting of thin, rigid, parallel cover members, having their outer faces clearly differentiated in appearance and configuration.

---

The case may be oriented by sight or touch, according to whether light or darkness prevails, to place either case-enclosed key desired, in a prescribed datum position, whereupon the selected key, whichever one it is, can be swung out to operating position by a simple, common, established procedure.

This invention relates to a combined key carrying and key operating case, and more particularly to a light, compact, inexpensive and convenient key case of rigid construction for holding a pair, only, of related keys, such as a pair in which the individual keys are designed, respectively, for operating the ignition switch of an automotive vehicle and for operating the door and trunk locks of the same vehicle.

There are many forms of key cases on the market, some composed of rigid and some of flexible materials.

Cases of the latter kind have the advantage that they completely enclose the keys, thereby protecting the garment pocket, or the inside of the purse in which the key-containing case is carried, against excessive wear. They have the disadvantages, however, that the case is relatively bulky, has to be unsnapped and opened to make the keys accessible at all, and carries the keys in a floppy manner. Opening the case is generally followed by a fumbling search for the key wanted, particularly if the key is to be used in the dark. There is no simple, standard manipulative procedure available for instantly selecting the desired key in daylight or darkness, and then swinging it into position for use. The case cannot be used as an operator for the selected key.

Rigid cases composed of two hingedly connected members have largely the same advantages and disadvantages as cases composed of flexible materials.

Rigid cases of fixed shape have been proposed for holding a plurality of keys, but these have invariably proved deficient for the present purpose for one or more reasons.

It is the primary object of the present invention to provide a rigid combined case and operator of fixed shape for a pair of similar, related, flat keys, such that the case can be instantly oriented by sight or touch to place the desired key in a datum position, and the key, thus singled out, regardless of which key it is, can then be swung out to operating position by a simple, standard manipulative procedure.

Other objects and adavntages will hereinafter appear.

In the drawing forming part of this specification:

Figure 1:
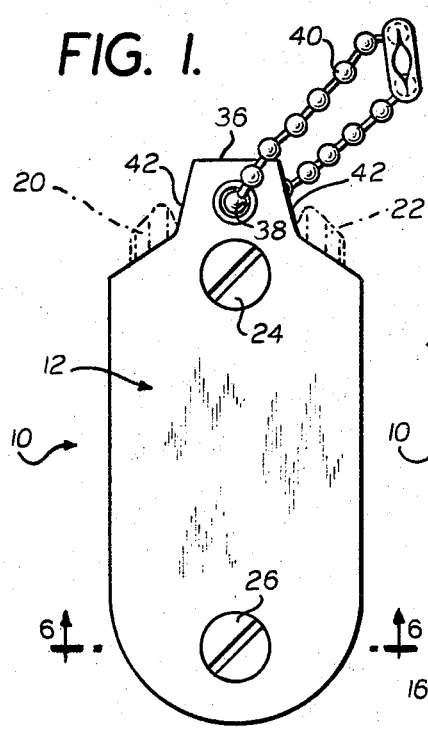
FIGURE 1 is a plan view showing a practical and advantageous key case and key operator with one side up, which embodies features of the invention.
Figure 2:
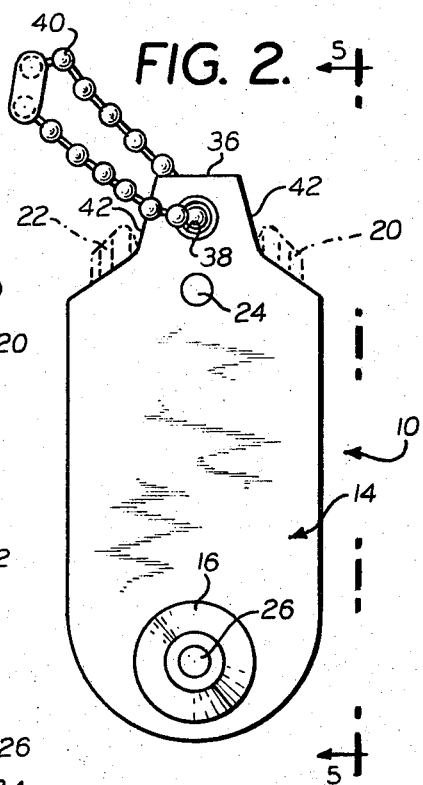
FIGURE 2 is a view similar to FIGURE 1, but with the case turned over so that the opposite side is up.
Figure 5:
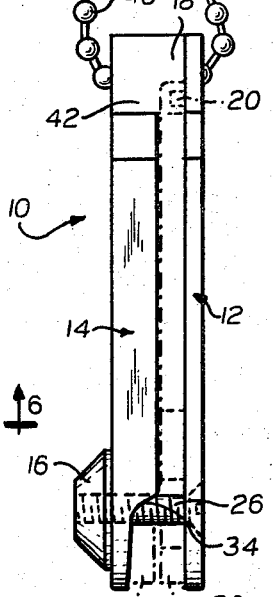
Figure 3:
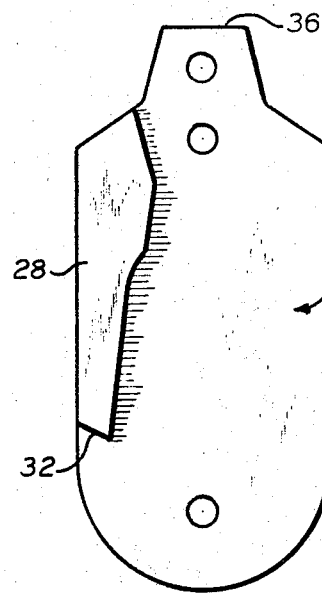
FIGURE 3 is a plan view showing the inner face of the side member which was up in FIGURE 1.
Figure 4:
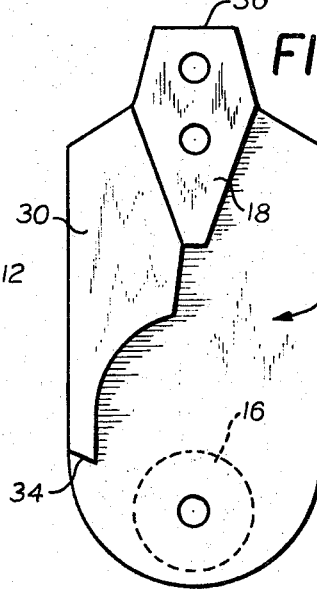
FIGURE 4 is a plan view showing the inner face of the side member which was up in FIGURE 2.
Figure 6:
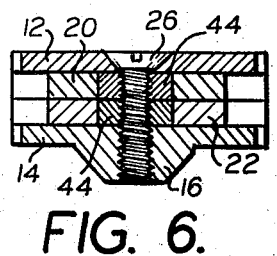

FIGURE 5 is an edge view of the novel key case of FIGURES 1 and 2, showing the case as it would be seen from along the line 5—5 of FIGURE 2, looking in the direction of the arrows; and FIGURE 6 is a transverse, sectional view taken upon the line 6—6 of FIGURE 1, looking in the direction of the arrows.

The illustrative combined case and operator 10 is composed chiefly of two rigid, elongated, registering, light, generally thin, cover members 12 and 14 of any suitable plastic of metallic composition. Preferably, the cover members 12 and 14 are molded or cast in the forms shown in FIGURES 1 to 4, inclusive.

The cover member 12 may be white in color, and the cover member 14 red. The members 12 and 14 may be of any attractive colors desired, however, so long as the colors contrast with one another. The outer face of the cover member 12 is made smooth, while the outer face of the cover member 14 is provided with a prominent boss 16, so that the cover members can be readily distinguished in the dark, by the sense of touch, from one another.

The cover members 12 and 14 are desirably of identical peripheral contour. Each is about twice as long as it is wide, has straight, parallel sides, and a rounded end.

The cover member 14 is formed with a spacer 18, and this spacer projects beyond the inner face of the side member 14 by a distance which is equal, substantially, to the combined thickness of the two keys 20 and 22, which the case is designed to hold.

A flat-headed screw 24 has its head contained in a countersink formed in the outer face of cover member 12, and its threaded stem or shank screwed into the cover member 14. The boss 16 is desirably made concentric with the screw receiving opening of the cover member 14, so that advantage is taken of the presence of the differentiating boss to provide an extended bore for the reception of screw 26. The screw 26 is both a pivot screw and a tensioning screw. It may be tightened to bend the cover members toward one another slightly at the pivot for frictionally retaining the keys within the case. The friction prevents accidental dislodgment of the keys from their assigned positions within the case, but it does not significantly interfere with manual operation of either key to an exposed, operative position.

The pivot screw 26 extends through openings formed in the head or handle portions of both the keys 22 and 24. The keys enter the case from opposite sides thereof. The keys are arrested by the spacer-stop 18 as they are swung into the case from opposite directions, respectively, in the positions in which they are shown in FIGURES 1 and 2.

The cover member 12 is formed with a thickening part 28 and the cover member 14 is formed with a corresponding thickening part 30. The part 28 is disposed in the plane of the key 22 and serves in conjunction with the cover member 14 to define a keyway for the key 20. The part 30 is disposed in the plane of the key 20 and serves in conjunction with the cover member 12 to define a keyway for the key 22. The parts 28 and 30 constitute stops for limiting outward movements of the keys 22 and 20, respectively. The stop faces 32 and 34 of the stops 28 and 30 may permit equal movements of the keys, but preferably they provide for unequal movements, since the user will come to know the range of each key and will immediately be appraised of the fact if he has made a mistake in the selection of a key.

At the end remote from the key pivot, the cover members 12 and 14, including the spacer-stop 18 of the latter, form a tongue 36 which extends beyond the head of screw 24. The tongue 36 is formed with a bore 38, through which a closed carrying chain 40 is looped.

The tongue 36 is flanked on either side by a key tip exposing notch 42, enabling the user to engage the tip of either key with a finger, for operating it to a fully exposed and operative position. Each key tip is normally contained well within the associated notch, so the pocket or purse material is well protected.

The procedure most convenient for exposing a key will depend on the individual user, but whatever technique he finds most advantageous for one key will, after orientation of the case, be most advantageous for the other key also.

Let it be supposed that after putting the case in the position of FIGURE 1, with the case held in the left hand, the operator engages the tip of key 22 with the index finger of the right hand by inserting the finger in the right hand notch 42, and swings the key clockwise to open position. If, instead, he wants the key 20, he will put the case in the position of FIGURE 2, with the case held in the left hand and will then engage the tip of key 20 with the index finger of the right hand by inserting the finger in the right hand notch 42, and will swing the key clockwise to open position. In other words, he will hold the case in the same hand at the conclusion of orientation and the manipulative process which then follows will be standard and uniform, regardless of which key has been selected for use. The orientation of the case will have controlled the selection of the key.

While a practical and advantageous embodiment has been shown and described with the guide-stop 28 integral with the cover member 12, and with the guide-stop 30 and the spacer-stop 18 integral with the cover member 14, it should be understood that these details are illustrative. Various components could be made as distinct parts and the parts then united by fusion, adhesion or otherwise. More particularly, the cover members 12 and 14, together with the guide-stops 28 and 30 and the spacer-stop 18, could all be cast or molded as an integral unit, in which case the screw 24 would become unnecessary.

The fact that the case can serve also as a key operator is of no importance from the standpoint of extra leverage or extra mechanical advantage, since a key should never be forced. It is important from the standpoint of convenience, because it enables the selected key and the case to be operated as a unit after the selected key has been swung out to operating position. It is not necessary for the user to grasp the key itself.

The keys for which the present case is designed may be of a familiar form. Each key desirably has a uniquely slotted and contoured shank portion for insertion in a keyhole or slot, a stop member for limiting insertion of the key in the slot, and a handle portion having an opening formed through it for the reception of the pivot screw 26. The pivot screw is located so near the end of the case that the key stop which is located between the shank and head of the key is necessarily freely exposed by the swinging of the key from within the case to an operating position. If the holes through the key handles are too large to fit the pivot screw with appropriate snugness, bushings 44 may be utilized as fillers, as shown in FIGURE 2.

I have described what I believe to be the best embodiments of my invention. I do not wish, however, to be confined to the embodiments shown, but what I desire to cover by Letters Patent is set forth in the appended claims.

I claim:

1. A combined case and operator for a pair of related flat keys, comprising, in combination, (a) a pair of rigid, elongated, registering, generally thin, parallel cover members having their outer faces clearly differentiated in configuration for ready identification by touch, (b) a pivot member for the pair of keys extending between the cover members, the cover and pivot members jointly defining normally open key operating paths in parallel, contiguous planes perpendicular to the axis of the pivot member.

(c) a common key stop means disposed between the cover members for limiting pivotal movement of the keys into the case from opposite sides of the case, said key stop means, together with the cover members, forming a tongue which protrudes beyond the key tips, and which is flanked at its opposite sides by notches in which the key tips are respectively exposed for finger operation, but protected, at least partially, against eroding contact with other objects, the construction and arrangement being such that the case may be oriented by touch to place the case with a selected, enclosed key in a datum position, whereupon the selected key, whichever one it is, can be swung out to operating position about the common pivot by a common, established manipulative procedure, and can then be operated and retracted by turning of the case and the selected key in unison.

2. A combined case and operator for a pair of related keys as set forth in claim 1, in which the cover members are also strikingly differentiated in appearance from one another so that orientation of the case can be effected by sight when light is available.

3. A combined case and operator for a pair of related keys as set forth in claim 1, in which the pivot member is a flat-headed pivot screw, countersunk in and passed through one cover member and threaded into the other, for drawing the cover members toward one another with regulated pressure, so that the keys may be frictionally held in the case.

4. A combined case and operator for a pair of related keys as set forth in claim 1, which further includes (d) limit stops on the inner faces of the cover member for intercepting and arresting the backs of the respective keys as they swing outward, for limiting pivotal opening movement of the keys to predetermined angles.

5. A combined case and operator for a pair of related keys as set forth in claim 1, in which the common pivot member is located so near the associated proximate ends of the cover members that the stop of either key, when in fully open position, will extend comfortably clear of the case.

6. A combined case and operator for a pair of related keys as set forth in claim 1 in which the tongue formed by the cover members and the stop is formed with a bore, and which further includes (d) a suspending chain lodged in the bore.

7. A combined case and operator for a pair of related keys as set forth in claim 1, in which the differentiation of cover configurations is effected by making the outer face of one cover member smooth and plane, and providing the outer face of the other cover member with a prominent boss.

8. A combined case and operator for a pair of related keys as set forth in claim 7 in which the boss surrounds the pivot bore of one of the cover members, thereby providing additional thickness of material for anchorange of the pivot screw.

9. A combined case and operator for a pair of related keys as set forth in claim 1 which further includes (d) a headed screw passed through the cover members and the stop in the tongue area for firmly clamping the cover members and the intervening stop together.

10. A combined case and operator for a pair of related keys as set forth in claim 4 in which the cover members, the stop means interposed between the cover members and the limit stops are all made integral with one another.

References Cited

UNITED STATES PATENTS

| 2,274,820 | 3/1942 | Bills | 70—456 |
| 2,306,970 | 12/1942 | MacPherson et al. | 70—456 |
| 2,618,958 | 11/1952 | Goodson | 70—456 |
| 2,729,965 | 1/1956 | Kurlian | 70—456 |
| 3,053,072 | 9/1962 | Morris | 70—456 |

MARVIN A. CHAMPION, *Primary Examiner.*

R. L. WALFE, *Assistant Examiner.*